(12) United States Patent
Cho et al.

(10) Patent No.: US 10,797,312 B2
(45) Date of Patent: Oct. 6, 2020

(54) SILICON-BASED ANODE ACTIVE MATERIAL AND METHOD FOR MANUFACTURING SAME

(71) Applicant: Nexeon Ltd, Oxfordshire (GB)

(72) Inventors: Young Tai Cho, Seoul (KR); Yong Gil Choi, Daejeon (KR); Seung Chul Park, Daejeon (KR); Seon Park, Daejeon (KR); Hee Young Seo, Daejeon (KR); Jee Hye Park, Daejeon (KR); Yong Eui Lee, Gyeonggi-do (KR); Chul Hwan Kim, Daejeon (KR)

(73) Assignee: Nexeon Ltd., Oxfordshire (GB)

( * ) Notice: Subject to any disclaimer, the term of this patent is extended or adjusted under 35 U.S.C. 154(b) by 265 days.

(21) Appl. No.: 15/538,592

(22) PCT Filed: Dec. 30, 2015

(86) PCT No.: PCT/KR2015/014530
§ 371 (c)(1),
(2) Date: Jun. 21, 2017

(87) PCT Pub. No.: WO2016/108645
PCT Pub. Date: Jul. 7, 2016

(65) Prior Publication Data
US 2017/0352883 A1    Dec. 7, 2017

(30) Foreign Application Priority Data
Dec. 31, 2014 (KR) .................. 10-2014-0195978

(51) Int. Cl.
| H01M 4/38 | (2006.01) |
| H01M 4/36 | (2006.01) |
| H01M 4/62 | (2006.01) |
| H01M 4/48 | (2010.01) |
| H01M 4/04 | (2006.01) |
| H01M 4/02 | (2006.01) |

(52) U.S. Cl.
CPC ............ *H01M 4/386* (2013.01); *H01M 4/04* (2013.01); *H01M 4/36* (2013.01); *H01M 4/366* (2013.01); *H01M 4/38* (2013.01); *H01M 4/388* (2013.01); *H01M 4/483* (2013.01); *H01M 4/62* (2013.01); *H01M 4/625* (2013.01); *H01M 2004/027* (2013.01)

(58) Field of Classification Search
CPC ........ H01M 4/386; H01M 4/04; H01M 4/366; H01M 4/625
See application file for complete search history.

(56) References Cited

U.S. PATENT DOCUMENTS

| 5,395,711 | A | 3/1995 | Tahara et al. |
| 8,945,431 | B2 | 2/2015 | Schulz et al. |
| 8,999,583 | B2 | 4/2015 | Hirose et al. |
| 10,008,716 | B2 | 6/2018 | Abdelsalam et al. |
| 10,077,506 | B2 | 9/2018 | Friend et al. |
| 10,090,513 | B2 | 10/2018 | Canham et al. |
| 10,103,379 | B2 | 10/2018 | Macklin et al. |
| 10,164,257 | B2 | 12/2018 | Otsuka et al. |
| 2002/0037433 | A1 | 3/2002 | Rasmussen et al. |
| 2002/0121460 | A1 | 9/2002 | Moy et al. |
| 2002/0164479 | A1 | 11/2002 | Matsubara et al. |
| 2003/0054250 | A1 | 3/2003 | Kweon et al. |
| 2003/0215711 | A1 | 11/2003 | Aramata et al. |
| 2004/0052867 | A1 | 3/2004 | Canham |
| 2004/0062990 | A1 | 4/2004 | Shimamura et al. |
| 2004/0166319 | A1 | 8/2004 | Li et al. |
| 2004/0185341 | A1 | 9/2004 | Yamamoto et al. |
| 2005/0031958 | A1 | 2/2005 | Fukuoka et al. |
| 2005/0233213 | A1* | 10/2005 | Lee ................... H01M 4/13 429/218.1 |
| 2006/0040182 | A1 | 2/2006 | Kawakami et al. |
| 2006/0166098 | A1 | 7/2006 | Tabuchi et al. |
| 2007/0031733 | A1 | 2/2007 | Kogetsu et al. |
| 2007/0111101 | A1 | 5/2007 | Ohkubo et al. |
| 2007/0111102 | A1 | 5/2007 | Inoue et al. |
| 2007/0224508 | A1 | 9/2007 | Aramata et al. |
| 2007/0281216 | A1 | 12/2007 | Petrat et al. |
| 2008/0090152 | A1 | 4/2008 | Kosuzu et al. |
| 2008/0124631 | A1 | 5/2008 | Fukui et al. |
| 2008/0145752 | A1 | 6/2008 | Hirose et al. |
| 2008/0305395 | A1 | 12/2008 | Hirose et al. |

(Continued)

FOREIGN PATENT DOCUMENTS

| EP | 2533331 B1 | 8/2015 |
| GB | 2495951 A | 5/2013 |

(Continued)

OTHER PUBLICATIONS

International Search Report dated May 4, 2016 for PCT/KR2015/014530.

(Continued)

*Primary Examiner* — Ula C Ruddock
*Assistant Examiner* — Thomas H. Parsons
(74) *Attorney, Agent, or Firm* — William R. Haulbrook; Michael D. Schmitt; Choate, Hall & Stewart LLP (57) ABSTRACT

The present invention relates to a silicon-based anode active material and a method for manufacturing the same. The silicon-based anode active material according to an embodiment of the present invention comprises: particles comprising silicon and oxygen combined with the silicon, and having a carbon-based conductive film coated on the outermost periphery thereof; and boron doped inside the particles, wherein with respect to the total weight of the particles and the doped boron, the boron is included in the amount of 0.01 weight % to 17 weight %, and the oxygen is included in the amount of 16 weight % to 29 weight %.

20 Claims, 6 Drawing Sheets

(56) References Cited

U.S. PATENT DOCUMENTS

| | | |
|---|---|---|
| 2009/0010833 A1 | 1/2009 | Rosenband et al. |
| 2009/0246628 A1 | 10/2009 | Adachi et al. |
| 2010/0009261 A1 | 1/2010 | Watanabe |
| 2010/0190062 A1 | 7/2010 | Yamamoto et al. |
| 2010/0209328 A1 | 8/2010 | Bi et al. |
| 2010/0243951 A1 | 9/2010 | Watanabe et al. |
| 2010/0285367 A1 | 11/2010 | Matsui et al. |
| 2011/0001097 A1 | 1/2011 | Aramata et al. |
| 2011/0085960 A1 | 4/2011 | Mukasyan et al. |
| 2011/0281180 A1 | 11/2011 | Kim et al. |
| 2011/0287317 A1 | 11/2011 | Nakanishi |
| 2011/0294012 A1 | 12/2011 | Nakabayashi et al. |
| 2011/0311873 A1* | 12/2011 | Schulz ............... H01M 4/0416 429/231.8 |
| 2012/0094178 A1 | 4/2012 | Loveridge et al. |
| 2012/0244438 A1* | 9/2012 | Kerlau ............... H01M 4/134 429/213 |
| 2013/0004846 A1* | 1/2013 | Kim ............... B82Y 30/00 429/213 |
| 2013/0040199 A1 | 2/2013 | Yamamura |
| 2013/0136986 A1 | 5/2013 | Scoyer et al. |
| 2013/0216907 A1 | 8/2013 | Rayner et al. |
| 2013/0224606 A1 | 8/2013 | Koh et al. |
| 2013/0337314 A1 | 12/2013 | Essaki et al. |
| 2014/0023928 A1 | 1/2014 | Jeon et al. |
| 2014/0050987 A1* | 2/2014 | Park ............... H01M 4/366 429/231.8 |
| 2014/0087268 A1 | 3/2014 | Kim et al. |
| 2014/0106230 A1 | 4/2014 | Kim et al. |
| 2014/0246398 A1 | 9/2014 | Zaghib et al. |
| 2014/0302396 A1 | 10/2014 | Lu et al. |
| 2014/0349183 A1 | 11/2014 | Macklin et al. |
| 2014/0349187 A1 | 11/2014 | Hirose et al. |
| 2015/0044571 A1 | 2/2015 | Abdelsalam et al. |
| 2015/0380735 A1 | 12/2015 | Tuduki et al. |
| 2016/0126538 A1 | 5/2016 | Hanelt et al. |
| 2016/0308205 A1 | 10/2016 | Canham et al. |
| 2017/0033357 A1 | 2/2017 | Cho et al. |
| 2017/0346079 A1 | 11/2017 | Friend et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0119826 A1 | 4/2019 | Friend et al. |
| 2019/0148718 A1 | 5/2019 | Hatazawa et al. |
| 2019/0296340 A1 | 9/2019 | Cho et al. |
| 2019/0326594 A1 | 10/2019 | Cho et al. |

FOREIGN PATENT DOCUMENTS

| | | |
|---|---|---|
| JP | 2000-082459 A | 3/2000 |
| JP | 2000-243395 A | 9/2000 |
| JP | 2001-266866 A | 9/2001 |
| JP | 2003-100296 | 4/2003 |
| JP | 2004-303593 A | 10/2004 |
| JP | 2004-311429 A | 11/2004 |
| JP | 2005-259697 A | 9/2005 |
| JP | 2010-021100 A | 1/2010 |
| JP | 4401984 | 1/2010 |
| JP | 2013/008585 A | 1/2013 |
| KR | 2003-0028241 A | 4/2003 |
| KR | 100 578 871 B1 | 5/2006 |
| KR | 10-2012-0089512 | 8/2012 |
| KR | 10-2014-0100514 | 8/2014 |
| KR | 10-1441447 | 9/2014 |
| WO | WO-2004/049473 A2 | 6/2004 |
| WO | WO-2004/086539 A1 | 10/2004 |
| WO | WO-2006/097380 A1 | 9/2006 |
| WO | WO-2011/135649 A1 | 11/2011 |
| WO | WO-2012/028857 A1 | 3/2012 |
| WO | WO-2012/028858 A1 | 3/2012 |
| WO | WO-2014/202529 A1 | 12/2014 |
| WO | WO-2015/03996 A1 | 1/2015 |
| WO | WO-2016/108645 A1 | 7/2016 |

OTHER PUBLICATIONS

Cui, et al. Doping and Electrical Transport in Silicon Nanowires, Journal of Physical Chemistry, 104(22):5213-5216 (2000).

Gao et al., Alloy formation in Nanostructured Silicon, Journal of Advanced Materials, 13(11):816-819 (2001).

Graetz, J. et al., Highly reversible lithium storage in nanostructured silicon, Journal of the Electrochemical Society, 6(9):194-197 (2003).

Hatchard, T. D. and Dahn, J. R., In Situ XRD and Electrochemical Study of the Reaction of Lithium with Amorphous Silicon, Journal of the Electrochemical Society, 151(6):A838-A842 (2004).

Jia et al., Novel Three-Dimensional Mesoporous Silicon for High Power Litium-Ion Battery Anode Material, Advs. Energy Mater., 1:1036-1039 (2011).

Jia et al., Supporting Information for Advs. Energy Mater., DOI: 10.1002/aenm.201100485: Novel Three-Dimensional Mesoporous Silicon for High Power Litium-Ion Battery Anode Material, Advanced Energy Materials, DOI: 10.1002/aenm.201100485, 4 pages, (2011).

Jung, S. C. et al., Anisotropic Volume Expansion of Crystalline Silicon during Electrochemical Lithium Insertion: An Atomic Level Rationale, Nano Letters, 12:5342-5347, (2012).

Li, H. et al., The crystal structural evolution of nano-Si anode caused by lithium insertion and extraction at room temperature, Solid State Ionics 135:181-191 (2000).

Oudenhoven, Jos F. M. et al., All-solid-State Lithium-Ion Microbatteries: A Review of Various Three-Dimensional Concepts, Adv. Energy Mater. 1:10-33 (2011).

Park, M. H. et al., Silicon Nanotube Battery Anodes, Nano Letters, 9(11):3844-3847 (2009).

Ren, W. et al., Preparation of porous silicon/carbon microspheres as high performance anode materials for lithium ion batteries, Journal of Materials Chemistry A: Materials for Energy and Sustainability, 3(11):5859-5865 (2015).

Rongguan, L. et al., Electrodeposited porous-microspheres Li—Si films as negative electrodes in lithium-ion batteries, Journal of Power Sources, 196(8):3868-3873 (2011).

Schmuck, M. et al, Alloying of electrodeposited silicon with lithium—a principal study of applicability as a node material for lithium ion batteries, J. Solid State Electrochem, 14:2203-2207 (2010).

Shin, H. C. et al., Nanoporous Structures Prepared by an Electrochemical Deposition Process, Advanced Materials, 15:19, 1610-1614 (2003).

Su, L. et al., Core Double-shell Si@$SiO_2$@C nanocomposites as anode materials for Li-ion batteries, Chemical Communication, 46:2590-2592 (2010).

Tarascon, J M. et al., An update of the Li metal-free rechargeable battery based on $Li_{1+x}Mn_2O_4$ cathodes and carbon anodes, Journal of Power Sources, 43-44:689-700 (1993).

Van Schalkwijk, Walter A. and Scrosati, Bruno, Advances in Lithium-Ion Batteries (edited 2002 Excerpts).

Wachtler, M. et al., Anodic materials for rechargeable Li-batteries, Journal of Power Sources 105:151-160 (2002).

Wakihara, M., Recent development in lithium ion batteries, Materials Science and Engineering, R33:109-134 (2001).

Winter, M. et al., Insertion Electrode Materials for Rechargeable Lithium Batteries, Adv. Mater. 10(10):725-763 (1988).

Xiao, et al., Stabilization of Silicon Anode for Li-ion Batteries, Journal of the Electrochemical Society, 157(10):1047-1051 (2010).

Yang, J. et al., Si/c composites for high capacity lithium storage materials, Journal of the Electrochemical Society, 6(8):154-156 (2003).

Yu et al., Reversible Storage of Lithium in Silver-Coated Three-Dimensional Macroporous Silicon, Adv. Mater., 22:2247-2250 (2010).

Zhou, G. W. et al., Controlled Li doping of Si nanowires by electrochemical insertion methods, Applied Physics Letters, 75(16):2447-2449 (1999).

* cited by examiner

SILICON-BASED ANODE ACTIVE MATERIAL AND METHOD FOR MANUFACTURING SAME

This application claims the priority of Korean Patent Application No. 10-2014-0195978, filed on Dec. 31, 2014 in the KIPO (Korean Intellectual Property Office), the disclosure of which is incorporated herein entirely by reference. Further, this application is the National Stage application of International Application No. PCT/KR2015/014530, filed Dec. 30, 2015, which designates the United States and was published in Korean. Each of these applications is hereby incorporated by reference in their entirety into the present application.

TECHNICAL FIELD

The present invention relates to a secondary battery, and more particularly, to a silicon-based anode active material for a secondary battery and a method of manufacturing the same.

BACKGROUND ART

A secondary battery is a battery that may be charged and discharged by using an electrode material having excellent reversibility. Typically, lithium secondary batteries have been commercialized. When a lithium-based metal is used as an anode material for a lithium secondary battery, the lithium secondary battery may short-circuited or explode due to formation of dendrites. Therefore, a carbon-based active material to and from which lithium may be intercalated or de-intercalated, such as crystalline carbon including graphite and artificial graphite having a theoretical capacity of 372 mAh/g, soft carbon, or hard carbon, is commonly used for an anode instead of the lithium-based metal. However, as the range of application of secondary batteries expands, there are further demand for higher capacity and higher output of secondary batteries. Therefore, non-carbon-based anode materials that may be alloyed with lithium and have sufficient capacities (500 mAh/g or larger) for replacing carbon-based anode materials, such as silicon (Si), tin (Sn), or aluminum (Al), are being spotlighted.

From among the non-carbon anode materials, silicon has a theoretical capacity of about 4,200 mAh/g, thus being important for application of a high capacity battery in terms of capacity. However, since the volume of silicon expands by about four times when charged, during charging and discharging, the volume expansion causes irreversible reactions, such as destruction of an electrical connection between active materials, separation of an active material from a current collector, and formation of a solid electrolyte interface (SEI) layer due to erosion of the active material by an electrode, and deterioration of service life associated therewith. Therefore, there are difficulties for commercializing a silicon-based anode material.

Although many suggestions have been made for realizing a relatively high capacity battery while improving service time thereof by minimizing the volume expansion and contraction of an active material, the most commercially promising suggestion is a $SiO_x$-based composite active material in which nano Si is dispersed. However, although a material containing $SiO_x$ may improve service lift by suppressing volume expansion, the material containing $SiO_x$ have limits including reduced capacity and deteriorated charge/discharge efficiency as compared to a material containing pure silicon. Therefore, for application of a silicon-based material, it is necessary to ensure sufficient service life by suppressing volume changes during charging and discharging and prevent capacity reduction and deterioration of charging/discharging efficiency simultaneously.

DISCLOSURE OF THE INVENTION

Technical Problem

The present invention provides a silicon-based anode active material that employs silicon for improved service life and exhibit high capacity and high charging/discharging efficiency.

The present invention also provides a method of economically and quickly mass-producing a silicon-based anode active material having the above-stated advantages.

Technical Solution

According to an aspect of the present invention, there is provided a silicon-based anode active material including a particle that includes silicon and oxygen combined with the silicon, wherein a carbon-based conductive film is coated on the outermost surface of the particle; and boron doped in the particle. In this case, the content of boron with respect to the total weight of the particle and the doped boron is within the range from 0.01 weight % to 17 weight %, and the content of oxygen is within the range from 16 weight % to 29 weight %. Preferably, the content of boron with respect to the total weight of the particle and the doped boron may be within the range from 5 weight % to 13 weight %. The content of the carbon-based conductive layer with respect to the total weight of the particle and the doped boron may be within the range from 4.5 weight % to 32 weight %.

According to an embodiment, the particle may include a silicon core, a silicon oxide shell on the silicon core, and the carbon-based conductive layer on the silicon oxide shell. At least a portion of the silicon oxide shell may include boronated silicon oxide (boro-silicate). The thickness of the boronated silicon oxide may be within the range from 3 nm to 15 nm. Furthermore, boron may be doped in the silicon core.

According to another aspect of the present invention, there is provided a method of manufacturing silicon-based anode active material, the method including providing primary particles of silicon, which is a starting material; providing a solvent including water, oxygen-containing liquid hydrocarbon, or a mixture thereof to oxidize the primary particles of silicon; forming a mixed solution by adding the primary particles of silicon to the solvent; obtaining slurries of the primary particles of silicon from the mixed solution; forming intermediate particles including silicon cores and silicon oxide shells surrounding the silicon cores by chemically oxidizing the surfaces of the primary particles of silicon by pulverizing or polishing the slurries; providing a boron-containing compound, which is a boron precursor for doping boron; forming secondary particles of silicon including the intermediate particles coated with the boron-containing compound; and diffusing boron into the secondary particles of silicon by performing a heat treatment with respect to the secondary particles of silicon.

According to an embodiment, the method may further include forming conductive layers on the secondary particles of silicon before or after the heat treatment. The oxygen-containing liquid hydrocarbon may include methanol, ethanol, isopropyl alcohol (IPA), hydrogen peroxide ($H_2O_2$), or a mixture of two or more thereof. The boron-containing compound may include $B(OH)_3$ (boric acid) or $H_3BO_3$.

The heat treatment is performed at a temperature within the range from 700° C. to 1,100° C.

According to another aspect of the present invention, there is provided a method of manufacturing a silicon-based anode active material, the method including providing primary particles of silicon, which is a starting material; providing intermediate particles including silicon and a silicon oxide by oxidizing the primary particles of silicon; coating boron sacrificing layers on the intermediate particles; and diffusing boron into the intermediate particles of silicon by performing a heat treatment with respect to the intermediate particles coated with the boron sacrificing layers. In this case, the method may further include forming conductive layers on the intermediate particles of silicon before or after the heat treatment.

The boron sacrificing layer may include any one or a mixture of two or more of $B_4C$, $B_2O_3$, $H_3BO_3$, $B_3Si$, and $B_6O$. The heat treatment may be performed at a temperature within the range from 700° C. to 1,100° C.

Advantageous Effects

According to an embodiment of the present invention, there is provided a silicon-based anode active material having composite particles, which include silicon and a silicon oxide formed by at least partially oxidizing silicon and are coated with carbon-based conductive layers or include particles included in carbon-based conductive matrixes, thereby improving service life by suppressing volume expansion of silicon due to charging and discharging and exhibiting high capacity retention by improving charging/discharging efficiency by doping boron in the particles.

Furthermore, according to embodiments of the present invention, there is provided a method of economically mass-producing a silicon-based anode active material a silicon-based anode active material having the above-stated advantages by doping boron via a heat treatment using a liquid boron precursor or a solid boron precursor.

MODE FOR CARRYING OUT THE INVENTION

Reference will now be made in detail to embodiments, examples of which are illustrated in the accompanying drawings, wherein like reference numerals refer to like elements throughout.

In this regard, the present embodiments may have different forms and should not be construed as being limited to the descriptions set forth herein. Accordingly, the embodiments are merely described below, by referring to the figures, to explain aspects.

Reference numerals of members in the drawings refer to the same members throughout the drawings. As used herein, the term "and/or" includes any and all combinations of one or more of the associated listed items The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

FIGS. 1A, 1B, 1C, and 1D are cross-sectional views of silicon-based anode active materials 100A, 100B, 100C, and 100D according to various embodiments of the present invention, respectively.

Figure 1A:
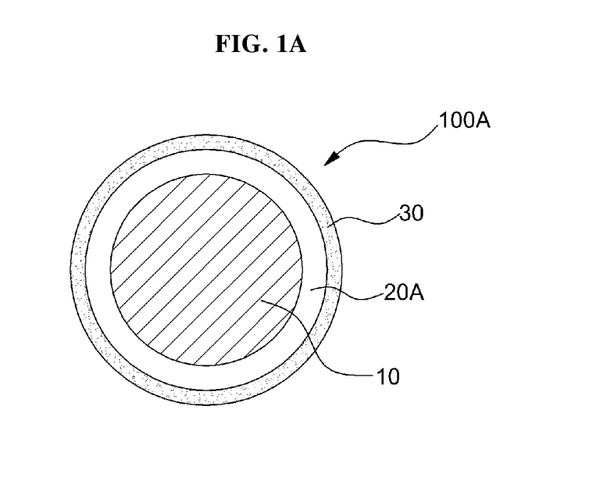
FIGS. 1A, 1B, 1C, and 1D are cross-sectional views of silicon-based anode active materials according to various embodiments of the present invention, respectively.
Figure 1B:
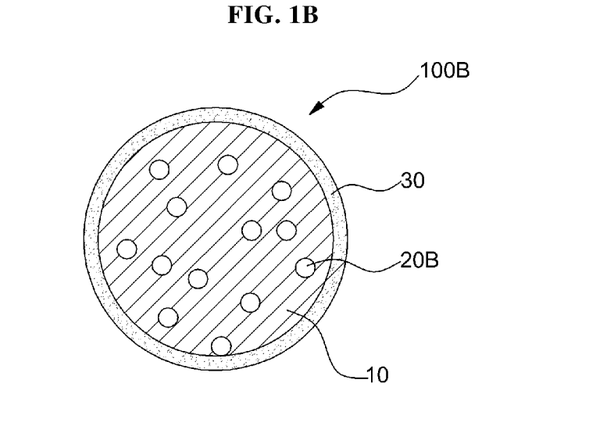

Referring to FIGS. 1A and 1B, each of the silicon-based anode active materials 100A and 100B have a particle structure. The silicon-based anode active material 100A of FIG. 1A may include a silicon core 10 and a silicon oxide shell 20A surrounding the core 10. According to another embodiment, as shown in FIG. 1B, the silicon-based anode active material 100B may include a silicon matrix 10 and a silicon oxide 20B dispersed in the matrix 10. The content of oxygen relative to the total weight of a silicon-based anode active material is within the range from 16 weight % to 20 weight %. When the content of oxygen is less than 16 weight %, the volume expansion suppressing force of the silicon-based anode active material is insufficient, and thus capacity retention and service life are deteriorated. When the content of oxygen is more than 29 weight %, the charge and discharge capacities of the silicon-based anode active material are rapidly reduced.

Figure 1C:
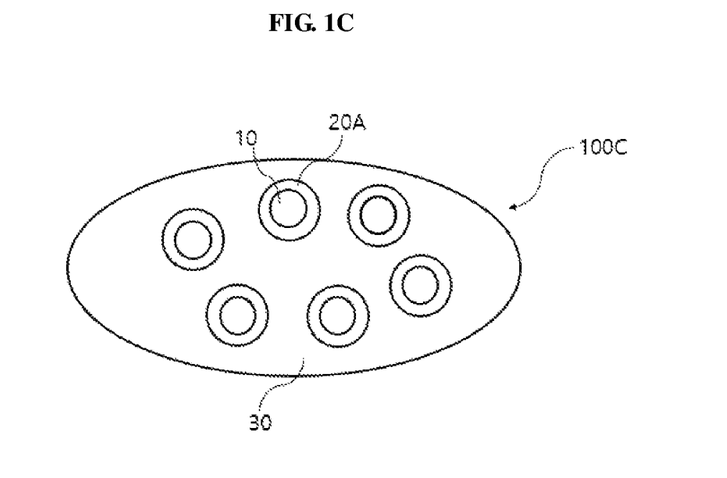
Figure 1D:
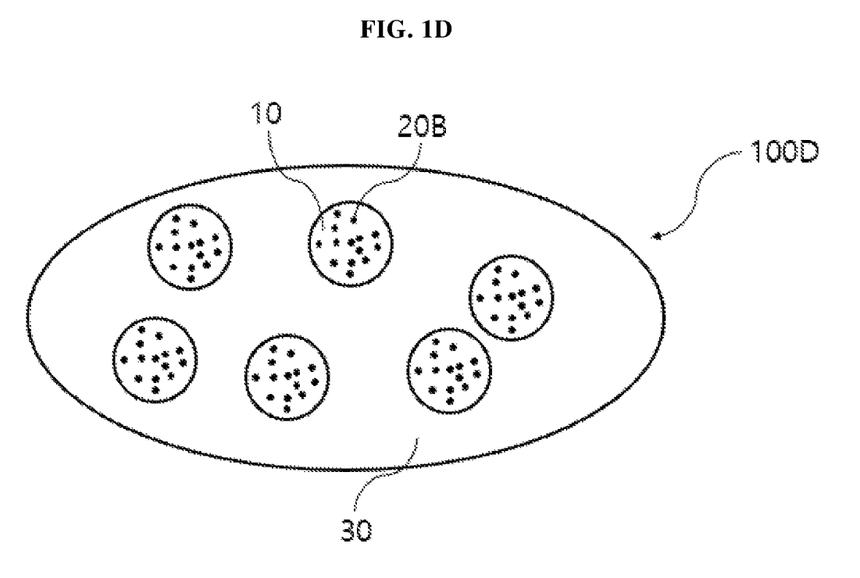

The silicon core 10 and the silicon matrix 10 may be primary particles or may be secondary particles that are formed as the primary particles are aggregated. Each of the silicon-based anode active materials 100A and 100B may further include a carbon-based conductive layer 30 at the outermost layer. The carbon-based conductive layer 30 is a layer for electrical interconnection between the silicon-based anode active materials 100A and 100B contacting each other and reduces the internal resistance to a current collector (not shown). The carbon-based conductive layer 30 may include a graphite film, a soft carbon film, a graphene film, an amorphous carbon film, or at least a partially-crystalline carbon film. Since the amorphous or low-crystalline carbon film is chemically resistant to an electrolyte, decomposition of the electrolyte is suppressed at the time of charging and discharging, and thus the service life of an anode may be improved. Furthermore, the carbon-based conductive layer 30 may include a mixed structure including an electro-conductive graphite structure SP2 and an insulating diamond structure SP3. In order for the carbon-based conductive layer 30 to have conductivity, the SP2 may have a larger mole fraction than the SP3, where the mole fraction may be controlled through a heat treatment process. The carbon-based conductive layer 30 may include a carbon material obtained by carbonizing a hydrocarbon-based precursor coating layer, which is for forming the carbon-based conductive layer 30, through heat treatment Furthermore, according to another embodiment, as shown in FIG. 1C, the silicon-based anode active material 100C may be formed by dispersing primary particles (may also be referred to as single particles) including the boron-doped silicon core 10 and the boronated silicon oxide shell 20A surrounding the core 10 of FIG. 1A in the carbon-based conductive matrix 30 (may be referred to as secondary particles or composite particles). Furthermore, according to another embodiment, as shown in FIG. 1D, the silicon-based anode active material 100D may be formed by dispersing the boron-doped silicon matrix 10 and the boronated oxide 20B dispersed in the silicon matrix 10 of FIG. 1B in the carbon-based conductive matrix 30. Here, the carbon-based conductive matrix 30 may form graphite, soft carbon, graphene, an amorphous carbon film, or at least a partially-crystalline carbon film. Furthermore, the carbon-based conductive matrix 30 may include a mixed structure including an electro-conductive graphite structure SP2 and an insulating diamond structure SP3, where the SP2 may have a larger mole fraction than SP3. Furthermore, the carbon-based conductive matrix 30 may include a carbon material obtained by carbonizing a hydrocarbon-based precursor coating layer of the carbon-based conductive matrix 30 through heat treatment.

The average particle size of the silicon-based anode active materials 100A and 100B having the particle structure may be within a range from 10 nm to 10 μm, but the present invention is not limited thereto. Boron is doped in the silicon-based anode active material 100A and 100B having the particle structure. According to an embodiment, the content of boron related to the total weight of the silicon-based anode active material 100A and 100B having the particle structure may be from 0.01 weight % to less than 17 weight %. When the content of boron is less than 0.01 weight %, the charging/discharging efficiency is hardly improved. When the content of boron is more than 17 weight %, the initial efficiency is rather reduced. The reason thereof may be formation of an excessive solid electrolyte interface (SEI).

Doped boron may penetrate into silicon and doped therein or may be combined with a silicon oxide and form a boron-silicate. Boron penetrated into silicon enhances the conductivity of silicon and minimizes reduction of the magnitude of potential size from surfaces to the interior of the silicon-based anode active materials 100A and 100B, thereby maintaining sufficient potential for reduction or oxidation of lithium throughout an active material layer. As a result, the initial charge capacity and the charge/discharge efficiency may be improved and capacity reduced due to silicon oxide for volume expansion suppression may be compensated for. Furthermore, the boronated silicon oxide shell 20A that is boronated in a core-shell structure, such as a silicon-based anode active material 100A, forms a stronger glass layer than a silicon oxide, thereby forming an SEI layer. As a result, decomposition of a silicon-based anode active material due to erosion of an electrode may be prevented, thereby reducing the life-span deterioration.

The thickness of the boronated silicon oxide shell 20A may be within the range from 3 nm to 15 nm. When the thickness of the boronated silicon oxide shell 20A is less than 3 nm, suppression of volume expansion and formation of a SEI layer are not effective. When the thickness is more than 15 nm, the boronated silicon oxide shell 20A may rather function as a barrier layer against intercalation and deintercalation of lithium, thereby causing decreases in a charging rate and a charging speed. A very thin continuous or non-continuous silicon carbide layer (SiC) may also be formed between the boronated silicon oxide shell 20A and the carbon-based conductive layer 30, which is a conductive layer.

As described above, boron doped in the silicon-based anode active materials 100A and 100B improves the initial charging rates of the silicon-based anode active materials 100A and 100B, thereby resolving capacity reduction of a silicon-based anode active material due to content of oxygen introduced for reducing volume expansion. As a result, a high capacity silicon-based active material with long service life may be provided. Although it is supposed that the improvement of the initial charging rate by boron is due to improvement of the conductivity of intrinsic silicon, the present invention is not limited by such a theoretical explanation.

As described above, when the content of oxygen related to the total weight of a silicon-based anode active material is maintained within the range from 16 weight % to 29 weight % and the content of boron is within the range from 0.01 weight % to 20 weight %, a silicon-based anode active material that are suitable for commercialization and has long service life by exhibiting the capacity per weight of 1,500 mAh/g, improved capacity retention based on suppression of volume expansion, and initial charging/discharging rates equal to or above 80% may be provided.

The content of boron was determined by dissolving a sample in aqua regia (nitric acid:hydrochloric acid=1:3) and quantifying the content of boron present in the sample by using an inductively coupled plasma spectrometer (ICP-AES).

The content of oxygen is measured according to an infrared ray detection method using a commercial element analyzer (ELTRA ONH-2000). Specifically, the amount of oxygen is quantified by changing the amount of oxygen present in a sample to carbon dioxide and measuring the amount of generated carbon dioxide by using the sample of 2 mg to 10 mg, a heat amount of 8 kW, and a carrier gas of helium (99.995% pure).

The amount of carbon may be measured according to an infrared detection method by measuring the amount of $CO_2$ obtained by burning carbon using a commercial carbon analyzer (c/s meter). Finally, the content of silicon may be evaluated based on a residual amount excluding the measured content of oxygen, boron, and carbon in the total weight of a particle.

Figure 2:
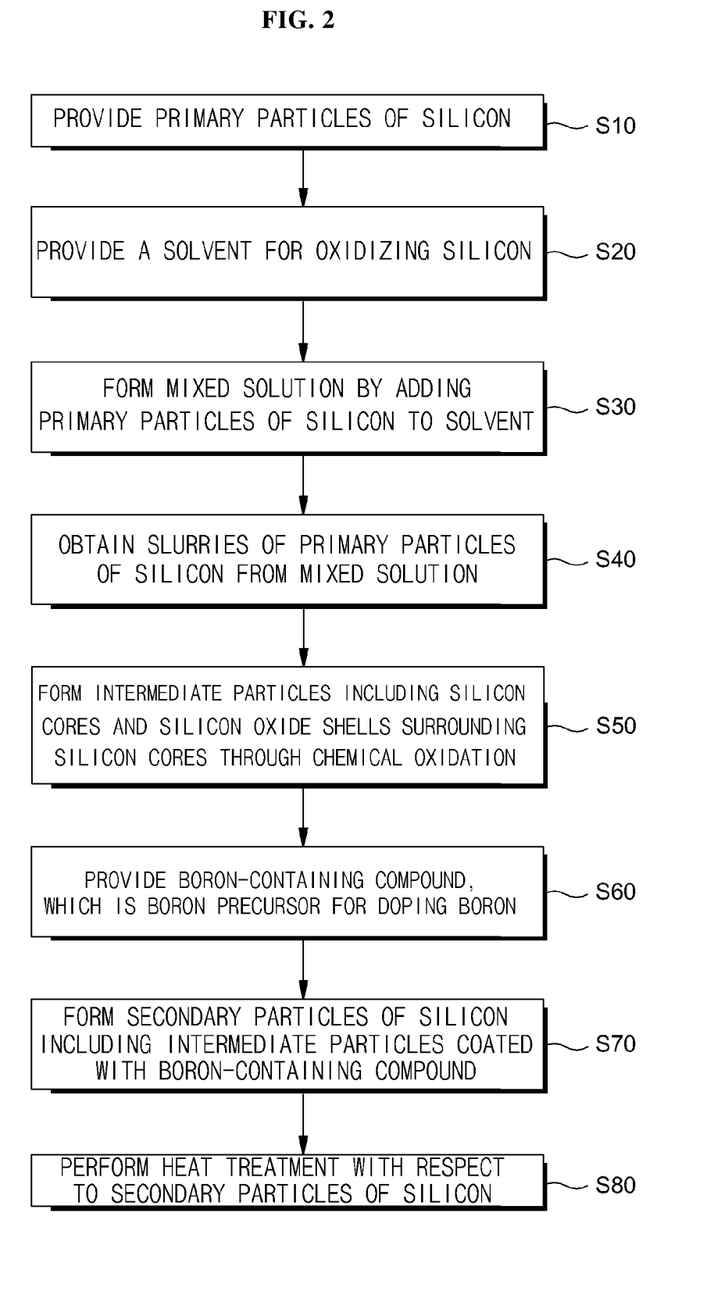
FIG. 2 is a flowchart showing a method of manufacturing a silicon-based anode active material according to an embodiment of the present invention.

FIG. 2 is a flowchart showing a method of manufacturing a silicon-based anode active material according to an embodiment of the present invention.

Referring to FIG. 2, primary particles of silicon as a starting material are provided (operation S10). The primary particles of silicon may be a polysilicon or monocrystalline silicon coarse particles and may even be amorphous with low crystallinity. Alternatively, the particles of silicon may be prepared by making the coarse particles into nanoparticles through a pulverizing process or a polishing process or through electrical explosion of a large-volume silicon material, e.g., a silicon rod or a wafer. The particles of silicon may preferably have an average particle diameter within a range from 20 nm to 300 nm, such that a silicon-based anode active material formed through a formation of a silicon oxide described below may have an average particle diameter within a range from 10 nm to 10 µm.

For oxidation of the primary particles of silicon, a solvent including water, an oxygen-containing liquid hydrocarbon, or a mixture thereof is provided (operation S20). The oxygen-containing liquid hydrocarbon material may include a mixed solvent of any one or more of methanol, ethanol, isopropyl alcohol (IPA), and hydrogen peroxide ($H_2O_2$). Preferably, the solvent may be water or methanol. The methanol is a hydrocarbon substance having the largest oxygen-to-carbon content and suppresses the carbon content compared with other hydrocarbon substances, thus being advantageous for forming a silicon-based anode active material composite including a silicon core and a silicon oxide shell formed on the core. Actually, other hydrocarbon substances may interfere formation of a silicon oxide on a silicon core, requires a separate heat treatment for removing carbon to form a silicon oxide, and densely forms $SiO_2$ that deteriorates the initial charging/discharging efficiency due to thermal oxidation.

Next, the primary particles of silicon are added to the solvent and the solvent is stirred to form a mixed solution (operation S30). Slurries of the primary particles of silicon are obtained from the mixed solution (operation S40).

Simultaneously with a pulverizing operation or a polishing operation regarding the slurries, the surfaces of the primary particles of silicon are chemically oxidized by at least one of compression stress or shearing stress induced on the surfaces of the primary particles of silicon during the pulverizing operation or the polishing operation, and thus intermediate particles including silicon cores and silicon oxide shells surrounding the silicon cores are formed (operation S50). The compression stress and the shearing stresses for forming the intermediate particles may be controlled based on at least one of the rotation speed, the rotation time, and the pressure of a milling operation.

A boron-containing compound, which is a boron precursor for doping boron, is provided (operation S60). According to an embodiment, the boron-containing compound may include $B(OH)_3$ (boric acid) or $H_3BO_3$. The boron-containing compound and the intermediate particles are mixed to form a mixture. The mixture may also be provided by coating the surfaces of the intermediate particles with a liquid boron-containing compound or forming a mixed solution by adding the intermediate particles and the boron-containing compound to a solvent as described above, such as water or ethanol. The mixture may be dried to form second particles of silicon coated with the boron-containing compound (operation S70).

Next, heat treatment is performed with respect to the second particles of silicon, thereby allowing boron to diffuse into the second particles of silicon (operation S80). The heat treatment may be performed at a temperature within a range from 700° C. to 1,100° C. The heat treatment may be performed by using an inert gas, such as argon or helium, but the present invention is not limited thereto. For example, the heat treatment may be performed in an oxidizing atmosphere using oxygen or ozone or in a reducing atmosphere using hydrogen or nitrogen gas. During the heat treatment, boron may react with the silicon oxide shells and form boronated silicon oxide. Furthermore, boron may be diffused into the silicon cores through the silicon oxide shells and doped in the silicon cores. If necessary, an operation for re-disintegrating the heat-treated particles may be performed.

Next, an operation for forming a carbon-based conductive layer on the silicon-based anode active material 100A may be further performed. According to another embodiment, an operation for forming the carbon-based conductive layer may be performed prior to the heat treatment for doping boron.

The carbon-based conductive layer may be formed by preparing a solution having dispersed therein a conductive material, which is a precursor, in a suitable solvent, dispersing the silicon-based anode active material in the solution, and drying the silicon-based anode active material. As a result, the carbon-based conductive layer may be provided. According to another embodiment, the carbon-based conductive layer may be obtained by dissolving a polymer precursor material, such as polyacrylonitrile (PAN), polyethylene (PE), polyacrylic acid (PAA), or polyvinylpyrrolidone (PVP), in a suitable solvent, dispersing silicon-based anode active material therein, obtaining intermediate particles that are wetted with the polymer precursor material, and drying and thermally treating the intermediate particles. As a result, the silicon-based anode active material 100A shown in FIG. 1A may be manufactured. The heat treatment for forming the carbon-based conductive layer may be performed in the same heat treatment operation as the heat treatment operation for doping boron. To this end, a heat treatment operation for doping boron is performed after a coating layer including a polymer precursor material, which is a precursor of a carbon-based conductive layer, is formed on primary particles, thereby achieving the carbon-based conductive layer through carbonization of the polymer precursor material, boronization of a silicon oxide layer, and boron doping to silicon cores.

Even in cases of FIGS. 1C and 1D, after forming fine globules in which a plurality of primary particles are uniformly dispersed in the polymer precursor material, such that the carbon-based conductive layer is contained in primary particles instead of being coated on every primary particles, the polymer precursor material is carbonized by performing a high-temperature heat treatment, thereby providing the silicon-based active material particles 100C and 100D in which a plurality of primary particles are dispersed in the carbon-based conductive matrix 30. Similar to the above-described method of manufacturing the silicon-based anode active materials 100A and 100B, the heat treatment for forming the carbon-based conductive matrix 30 or the heat treatment for boronization may be performed simultaneously or the heat treatment for forming the carbon-based conductive matrix 30 may be performed after the heat treatment for boronization is performed, thereby forming the silicon-based active material particles 100C and 100D.

Figure 3:
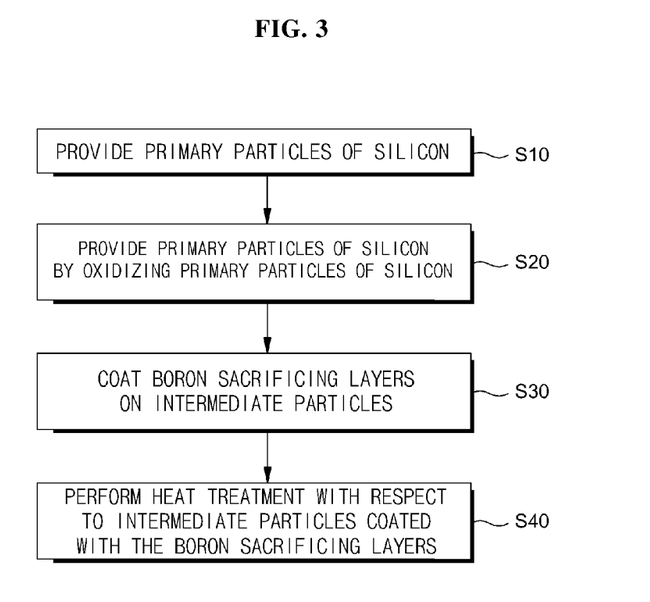
FIG. 3 is a flowchart showing a method of manufacturing a silicon-based anode active material according to another embodiment of the present invention.

FIG. 3 is a flowchart showing a method of manufacturing a silicon-based anode active material according to another embodiment of the present invention.

Referring to FIG. 3, primary particles of silicon as a starting material are provided (operation S10). Next, an oxidization operation for binding oxygen to the primary particles of silicon is performed to produce intermediate particles containing silicon and a silicon oxide (operation S20). The oxidation operation may be achieved by chemically oxidizing the primary particles of silicon in an oxygen-containing liquid solvent. The oxygen-containing liquid solvent may be water, methanol, ethanol, isopropyl alcohol (IPA), hydrogen peroxide ($H_2O_2$), or a mixture of two or more thereof and may preferably be water or methanol. In this case, intermediate particles including silicon cores and silicon dioxide shells formed on the silicon cores may be produced.

According to another embodiment, the oxidation operation may be performed through an oxygen ion implantation operation. The primary particles of silicon become a silicon matrix, and intermediate particles including a silicon oxide in which the ion-implanted oxygen is dispersed in the silicon matrix may be provided. Ion implantation energy and density for the ion implantation are controlled, such that the oxygen content with respect to the total weight of the produced silicon-based anode active material is limited to from 16 weight % to 29 weight %. While avoiding thermal oxidation of silicon, a heat treatment may be additionally performed at a low temperature from 50° C. to 200° C. for the bonding between silicon matrix and injected oxygen.

According to another embodiment, the primary particles of silicon may be chemically oxidized by at least one of compression stress and shearing stress simultaneously induced as an operation for pulverizing or polishing coarse particles of silicon is performed. For example, when slurries of particles of silicon are prepared by using the above-stated oxygen-containing liquid solvent and the slurries are subjected to a pulverizing and polishing operation through a milling operation, grain becomes fine and sensitivity of stress increases, thereby facilitating the chemical oxidation of the primary particles of silicon. In this case, intermediate particles including silicon cores and silicon dioxide shells formed on the silicon cores may be produced.

Next, boron sacrificing layers are formed on the intermediate particles (operation S30). The boron sacrificing layer may include a solid boron precursor, which is any one or a mixture of two or more of $B_4C$, $B_2O_3$, $H_3BO_3$, $B_3Si$, $B_6O$, and $B_4C$. The formation of the boron sacrificing layers may be achieved by coating the boron precursor on the intermediate particles by using a suitable solvent. Alternatively, a boron sacrificing layer may be formed by coating liquid $B(OH)_3$ on the intermediate particles.

Next, a boron-doped silicon-based anode active material may be manufactured by performing a heat treatment on the intermediate particles having formed thereon the boron sacrificing layer (operation S40). The heat treatment may be performed within a range from 700° C. to 1,100° C. During the heat treatment, the boron sacrificing layer is decomposed, and thus boron diffuses into the silicon and may react with silicon oxide to form borosilicate. Next, an additional pulverizing operation may be performed to atomize the heat-treated silicon-based anode active material. Furthermore, an operation for forming a conductive layer on the silicon-based anode active material 100B may be further performed. The above-stated operation may be referred to for the formation of the conductive layer. As a result, the silicon-based anode active material 100B shown in FIG. 1B may be provided. The above-stated operation may also be referred to for the formation of the carbon-based conductive matrix.

Hereinafter, embodiments of the present invention will be described in more details with reference to experimental examples. Specific values of the experimental examples below are merely examples, and it should be clearly understood that the present invention is not limited thereto.

Experimental Examples and Comparative Experimental Example

After silicon powder (average particle size was 5 μm and 99.9% pure) was dispersed in methanol, the resultant was subjected to pulverization-dispersion to nanoparticles having particle sizes within the range from 10 nm to 300 nm by using a nano pulverization-disperser (KM-5L), and a silicon oxide was formed through stirring and circulation.

Boric acid (99.9%) was added to the dispersion liquid containing the wet oxidized silicon particles, dissolved, and dried, thereby coating the surface of the silicon particles with boric acid. The coated silicon particles were treated in argon (Ar) gas atmosphere at about 900° C. for about 3 hours to induce diffusion of boron into the silicon-based particles.

The polyvinylpyrrolidone (PVP) was coated on the silicon particles that have been subjected to the boronization treatment and the coated silicon particles were treated in argon (Ar) gas atmosphere at about 900° C. for about 3 hours. As a result, a silicon-based anode active material in which boron having a core-shell structure including an outermost carbon film was manufactured. The particles of the silicon-based anode active material have sizes within the range from about 10 nm to 300 nm. The comparative sample is a silicon-based anode active material of a particle structure in which carbon films are formed on particles containing silicon and a silicon oxide, where the comparative sample is not doped with boron. During the preparation of the sample, the content of each ingredient may be controlled by controlling size of silicon powder, a solvent for wet oxidation of silicon, concentration of boric acid, and concentration of a carbon film precursor.

The weight ratios between the sample and the comparative samples are obtained by mixing a sample and a comparative sample, a conductive material, and a binder to prepare a anode slurry, coating the same on the current collector to produce a anode, and manufacturing a half coin-cell using lithium metal as a counter electrode. The capacity and the initial efficiency of the coin cell were evaluated under the condition of 0.1 C charging and 0.1 C discharging, and the life characteristics thereof were evaluated under the condition of 0.5 C charging and 0.5 C discharging.

Table 1 shows the contents of silicon, oxygen, and boron in the active material of the samples according to an embodiment of the present invention and the samples according to the comparative example (comparative samples) and the discharge capacity of the silicon-based anode active material. The performance evaluation was performed with respect to the initial discharge capacity (mAh/g), the single charge/discharge efficiency (%, referred to as the initial efficiency), and the capacity retention rate (retention, %) after 50 charges/discharges. The respective contents of boron in the samples according to an embodiment of the present invention were 0.01 weight %, 0.02 weight %, 1 weight %, 5 weight %, 13 weight %, 16 weight %, and 19 weight % within the range from 0.01 weight % to 17 weight %, and the contents of oxygen were 16.5 weight %, 18.3 weight %, 19.1 weight %, 20.0 weight %, 21.3 weight %, 22.0 weight %, 25.7 weight %, and 28.9 weight % within the range from 16% to 29 weight %. Furthermore, in the samples according to an embodiment of the present invention, the contents of the carbon film with respect to the total weight of the particles and the doped boron were 4.5 weight %, 10.7 weight %, 14.3 weight %, 16.5 weight %, 16.9 weight %, 22.0 weight %, 23.7 weight %, and 31.8 weight % within the range from 4.5 weight % to 32 weight %.

TABLE 1

| Sample | Boron Content (weight %) | Silicon Content (weight %) | Oxygen Content (weight %) | Carbon Content (weight %) | Discharge Capacity (mAh/g) | Initial Efficiency (%) | Capacity Retention (%) |
|---|---|---|---|---|---|---|---|
| Comparative Example 1 | 0 | 77.3 | 2.9 | 19.8 | 1290.0 | 78.5 | 42.1 |
| Comparative Example 2 | 0 | 45.2 | 29.0 | 25.8 | 1138.0 | 76.2 | 85.9 |
| Sample 1 | 0.01 | 56.0 | 20.0 | 24.0 | 1099.6 | 85.2 | 89.1 |
| Sample2 | 0.02 | 47.4 | 28.9 | 23.7 | 1104.1 | 86.3 | 93.5 |
| Sample3 | 1 | 55.7 | 21.3 | 22.0 | 1620.0 | 87.6 | 91.4 |
| Sample4 | 5 | 68.5 | 22.0 | 4.5 | 2620.0 | 91.2 | 91.4 |
| Sample5 | 13 | 51.4 | 19.1 | 16.5 | 2198.0 | 89.9 | 91.2 |
| Sample6 | 13 | 58.0 | 18.3 | 10.7 | 2191.7 | 90.5 | 92.3 |
| Sample7 | 16 | 49.7 | 20.0 | 14.3 | 1628.3 | 87.7 | 91.3 |
| Sample8 | 16 | 50.6 | 16.5 | 16.9 | 1668.0 | 89.9 | 85.2 |
| Sample9 | 19 | 23.5 | 25.7 | 31.8 | 723.0 | 78.2 | 85.3 |
| Comparative Example 3 | 21 | 46.0 | 4.5 | 28.5 | 714.0 | 76.1 | 52.1 |
| Comparative Example 4 | 22 | 4.7 | 31.2 | 42.1 | 431.5 | 74.2 | 49.8 |

Figure 4:
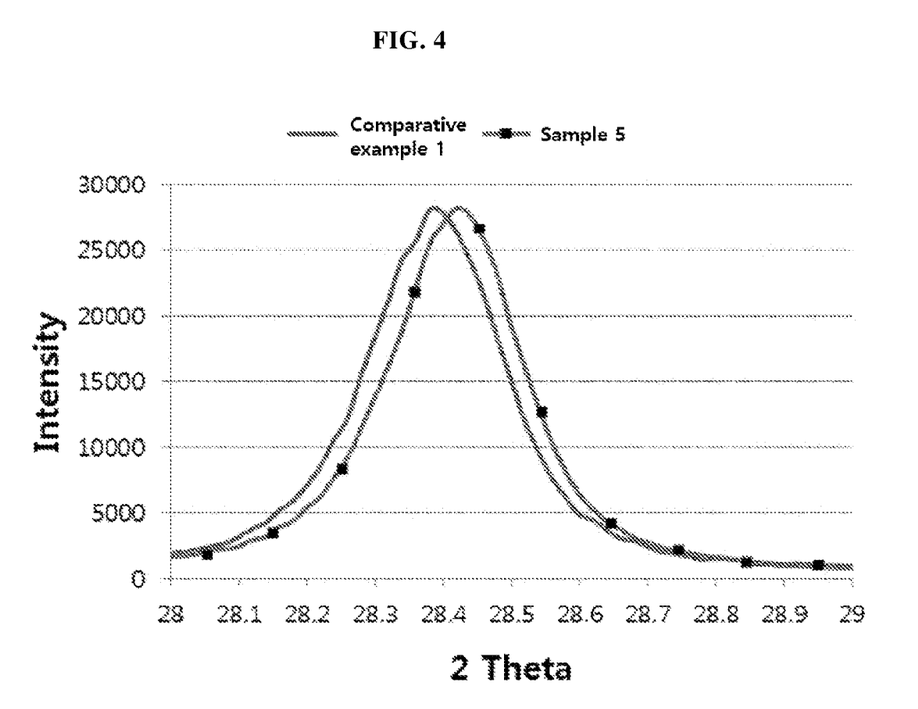
FIG. 4 is a graph showing a measurement result of an X-ray diffraction of a sample 5 according to an embodiment of the present invention and a comparative example 1.
Figure 5:
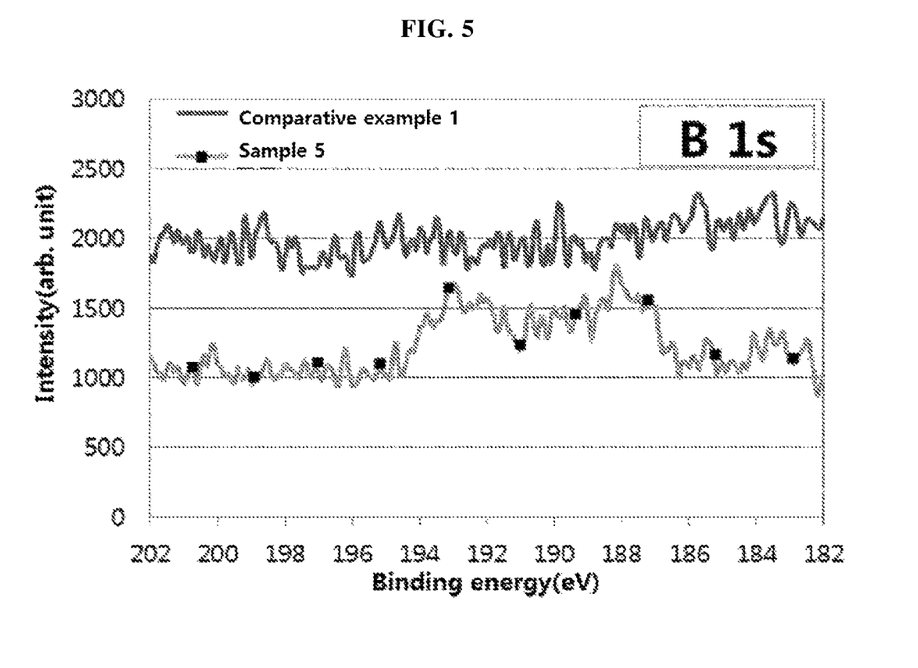
FIG. 5 is a graph showing a measurement result of an X-ray photoelectron spectroscopy of the sample 5 according to an embodiment of the present invention and the comparative example 1.

FIG. 4 is a graph showing a measurement result of an X-ray diffraction of the sample 5 according to an embodiment of the present invention and the comparative example 1, and FIG. 5 is a graph showing a measurement result of an X-ray photoelectron spectroscopy of the sample 5 according to an embodiment of the present invention and the comparative example 1.

Referring to FIG. 4, as the inter-lattice distance of crystalline silicon increases due to the doping of boron in the crystalline silicon inside particles, the result of the X-ray diffraction measurement shows that 2 theta (2θ) was moved in the direction of increasing by 0.1.

Referring to FIG. 5, the existence of boronated silicon oxide is confirmed as a signal indicating bond energy of Si—B and bond energy of B-0 of the orbit 1S of boron is detected on a surface during boron treatment.

Figure 6:
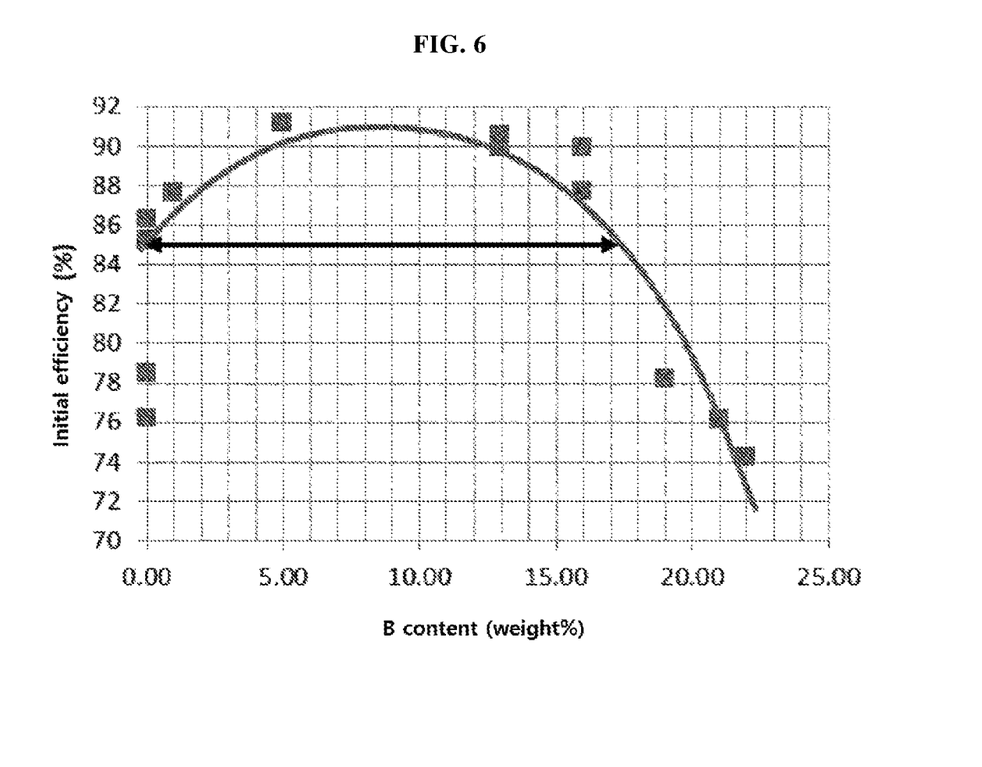
FIG. 6 is a graph showing discharge capacities and initial charge/discharge efficiencies of samples and comparative examples of Table 1.
Figure 7:
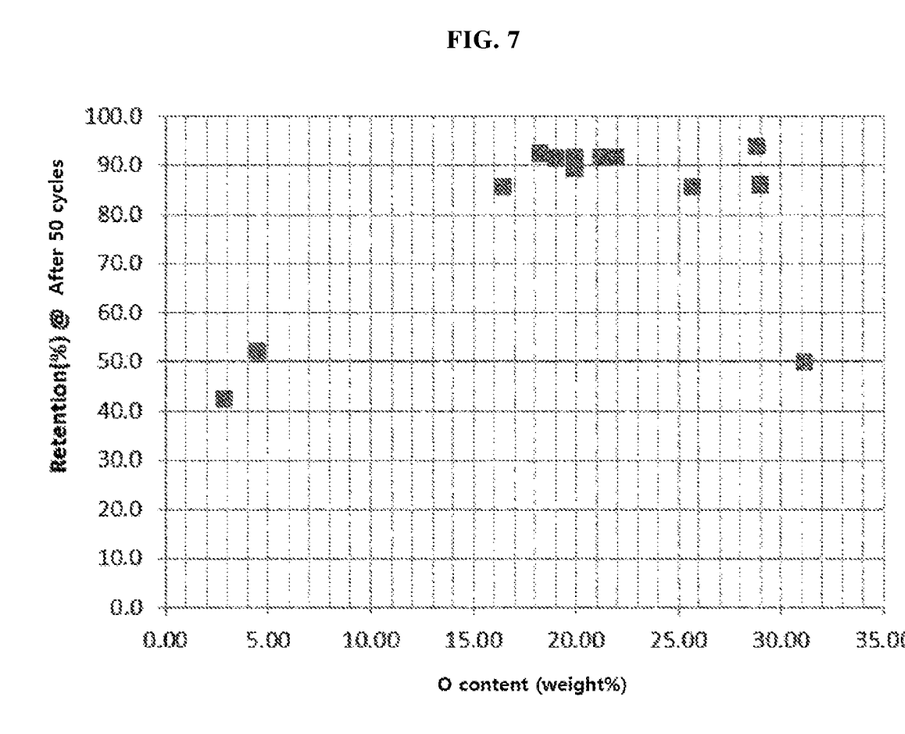
FIG. 7 is a graph showing the capacity retentions after 50 cycles of the samples and the comparative examples.

FIG. 6 is a graph showing discharge capacities and initial charge/discharge efficiencies of the samples and comparative examples of Table 1, and FIG. 7 is a graph showing the capacity retentions after 50 cycles of the samples and the comparative examples.

Referring to FIG. 6, the initial charge-discharge efficiencies exceeding 80% may be observed in the samples with boron content within the range from 0.01 weight % to 20 weight %. In cases of the comparative examples 1 and 2 with boron contents less than 0.01 weight %, the initial charge/discharge efficiencies were 78.5% and 76.2%, respectively. In other words, capacities decreased due to addition of oxygen. Similarly, in the cases of the comparative example 3 (boron content of 21 weight %) and the comparative example 4 (boron content of 24 weight %) with boron contents exceeding 20 weight %, the initial charge-discharge efficiencies were reduced to 76.1% and 74.2%.

Referring to FIG. 7, the comparative example 2 corresponding to the silicon-based anode active material with the oxygen content of 29 weight % without boron exhibited fine capacity retention. However, the capacity decreases to 1138.0 and the initial efficiency is deteriorated to 76.2%. However, the boron-doped samples according to the embodiment of the present invention with oxygen contents within the range from 16 weight % to 29 weight % exhibited the capacity retentions after 50 cycles at or higher than 85%, commercial-grade service life, and high initial efficiency without deterioration.

The comparative example 3 with oxygen content less than 16 weight % exhibited the capacity retention ratio of only 52.1%, and the comparative example 4 with oxygen content exceeding 30 weight % exhibited a significantly low initial charge capacity of 431.5 mAh/g. According to an embodiment of the present invention, as oxygen content increases in a silicon-based anode active material, the initial capacity and the initial charge-discharge efficiency tend to decrease. However, the decrease of the initial charge/discharge efficiency is compensated as boron is doped, and thus a silicon-based anode active material that may exhibit high charge-discharge efficiency and long service life may be provided.

While the present invention has been described in connection with what is presently considered to be practical exemplary embodiments, it is to be understood that the invention is not limited to the disclosed embodiments, but, on the contrary, will be apparent to those of ordinary skill in the art.

Industrial Applicability

While the inventive concept has been particularly shown and described with reference to exemplary embodiments thereof, it will be understood that various changes in form and details may be made therein without departing from the spirit and scope of the following claims.

The invention claimed is:

1. A silicon-based anode active material comprising a plurality of particles, wherein for each of the plurality of particles:
   the particle comprises silicon and oxygen combined with the silicon and a carbon-based conductive layer coated on the outermost surface of the particle, wherein the particle comprises a silicon core, a silicon oxide shell on the silicon core, and the carbon-based conductive layer on the silicon oxide shell; and
   boron is doped in the particle,
   wherein the content of boron with respect to the total weight of the particle and the doped boron is within the range from 0.01 weight% to 20 weight%,
   wherein the content of oxygen in the particle is within the range from 16 weight% to 29 weight%,
   wherein the thickness of the silicon oxide shell is within the range from 3 nm to 15 nm and wherein at least a portion of the shell comprises boronated silicon oxide, and wherein the plurality of particles comprising the silicon core and the silicon oxide shell on the silicon core has an average particle diameter within the range from 10 nm to 300 nm.

2. The silicon-based anode active material of claim 1, wherein the content of boron with respect to the total weight of the particle and the doped boron is within the range from 5 weight% to 13 weight%.

3. The silicon-based anode active material of claim 1, wherein the content of the carbon-based conductive layer with respect to the total weight of the particle and the doped boron is within the range from 4.5 weight% to 32 weight%.

4. The silicon-based anode active material of claim 1, wherein boron is doped in the silicon core.

5. The silicon-based anode active material of claim 1, wherein the content of boron is within the range from 0.01 weight% to 17 weight%.

6. A silicon-based anode active material comprising:
primary particles including boron-doped silicon cores and shells that surround the silicon cores and include boronated silicon oxide; and
a carbon-based conductive matrix having dispersed therein the primary particles,
wherein the content of boron with respect to the total weight of the particle and the doped boron is within the range from 0.01 weight% to 20 weight%,
wherein the content of oxygen is within the range from 16 weight% to 29 weight%,
wherein the primary particles have an average particle diameter within a range from 10 nm to 300 nm, and
wherein the thickness of the shells is within the range from 3 nm to 15 nm.

7. The silicon-based anode active material of claim 6, wherein the content of boron is within the range from 0.01 weight% to 17 weight%.

8. A method of manufacturing silicon-based anode active material, the method comprising:
providing primary particles of silicon, which is a starting material;
providing a solvent including water, oxygen-containing liquid hydrocarbon, or a mixture thereof to oxidize the primary particles of silicon;
forming a mixed solution by adding the primary particles of silicon to the solvent;
obtaining slurries of the primary particles of silicon from the mixed solution;
forming intermediate particles including silicon cores and silicon oxide shells surrounding the silicon cores by chemically oxidizing the surfaces of the primary particles of silicon by pulverizing or polishing the slurries;
providing a boron-containing compound, which is a boron precursor for doping boron;
forming second particles of silicon including the intermediate particles coated with the boron-containing compound; and
diffusing boron into the second particles of silicon by performing a heat treatment with respect to the second particles of silicon to form particles having an average particle diameter within a range from 10 nm to 300 nm.

9. The method of claim 8, further comprising forming conductive layers on the second particles of silicon before or after the heat treatment.

10. The method of claim 9, wherein the conductive layers are carbon-based conductive layers.

11. The method of claim 9, wherein forming the conductive layers comprises dispersing the second particle of silicon into a carbon-based conductive matrix.

12. The method of claim 8, wherein the oxygen-containing liquid hydrocarbon comprises methanol, ethanol, isopropyl alcohol (IPA), hydrogen peroxide ($H_2O_2$), or a mixture of two or more thereof.

13. The method of claim 8, wherein the boron-containing compound comprises $B(OH)_3$ (boric acid) or $H_3BO_3$.

14. The method of claim 8, wherein the heat treatment is performed at a temperature within the range from 700° C. to 1,100° C.

15. A method of manufacturing a silicon-based anode active material, the method comprising:
providing primary particles of silicon, which is a starting material;
providing intermediate particles including silicon and a silicon oxide by oxidizing the primary particles of silicon;
coating boron sacrificing layers on the intermediate particles; and
diffusing boron into the intermediate particles of silicon by performing a heat treatment with respect to the intermediate particles coated with the boron sacrificing layers to form particles having an average particle diameter within a range from 10 nm to 300 nm.

16. The method of claim 15, further comprising forming conductive layers on the intermediate particles of silicon before or after the heat treatment.

17. The method of claim 16, wherein the conductive layers are carbon-based conductive layers.

18. The method of claim 16, wherein forming the conductive layers comprises dispersing the second particle of silicon into a carbon-based conductive matrix.

19. The method of claim 15, wherein the boron sacrificing layer comprises any one or a mixture of two or more of $B_4C$, $B_2O_3$, $H_3BO_3$, $B_3Si$, and $B_6O$.

20. The method of claim 15, wherein the heat treatment is performed at a temperature within the range from 700° C. to 1,100° C.

* * * * *